United States Patent
Mazuz et al.

(10) Patent No.: US 8,660,265 B2
(45) Date of Patent: Feb. 25, 2014

(54) CIPHER IMPLEMENTATION

(75) Inventors: Gadi Mazuz, Shoham (IL); Yuval Greisas, Hod Hasharon (IL)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 12/881,167

(22) Filed: Sep. 13, 2010

(65) Prior Publication Data

US 2010/0329451 A1 Dec. 30, 2010

Related U.S. Application Data

(63) Continuation of application No. 10/286,800, filed on Nov. 4, 2002, now Pat. No. 7,796,752.

(51) Int. Cl.
*H04L 29/06* (2006.01)

(52) U.S. Cl.
USPC ............. 380/37; 380/259; 380/262; 380/265; 380/277; 380/44; 713/171

(58) Field of Classification Search
USPC .......................................................... 380/37
See application file for complete search history.

(56) References Cited

U.S. PATENT DOCUMENTS

| | | | |
|---|---|---|---|
| 5,727,062 A * | 3/1998 | Ritter | 380/37 |
| 6,075,859 A * | 6/2000 | Rose | 380/247 |
| 6,182,216 B1 * | 1/2001 | Luyster | 713/168 |
| 6,304,657 B1 * | 10/2001 | Yokota et al. | 380/28 |
| 6,324,288 B1 * | 11/2001 | Hoffman | 380/249 |
| 6,385,316 B1 * | 5/2002 | Rose | 380/28 |
| 6,944,183 B1 * | 9/2005 | Iyer et al. | 370/466 |
| 6,980,658 B1 * | 12/2005 | Rezaiifar et al. | 380/274 |
| 7,167,560 B2 * | 1/2007 | Yu | 380/200 |
| 7,221,757 B2 * | 5/2007 | Alao | 380/37 |
| 7,243,236 B1 * | 7/2007 | Sibert | 713/179 |
| 7,249,109 B1 * | 7/2007 | Silverbrook et al. | 705/67 |
| 7,415,109 B2 * | 8/2008 | Rose et al. | 380/37 |
| 2002/0186841 A1 * | 12/2002 | Averbuj et al. | 380/44 |
| 2004/0034772 A1 * | 2/2004 | Alao | 713/168 |

OTHER PUBLICATIONS

Adams, C. The Shade Cipher: An Efficient Hash-Function-Based Feistel Network. IEEE 1997 Canadian Conference on Electrical and Computer Engineering, 1997. Engineering Innovation: Voyage of Discovery. vol. 1. Pub. Date: 1997. Relevant pp. 338-342. Found on the World Wide Web: http://ieeexplore.ieee.org/stamp/stamp.jsp?tp=&arnumber=614858.*

* cited by examiner

*Primary Examiner* — Nathan Flynn
*Assistant Examiner* — Jeremiah Avery

(57) ABSTRACT

At least one of a keystream and a message authentication code are generated with a partial KASUMI block cipher, without utilizing a full KASUMI block cipher.

24 Claims, 5 Drawing Sheets

CIPHER IMPLEMENTATION

CROSS-REFERENCE TO RELATED APPLICATION

This application is a continuation of U.S. patent application Ser. No. 10/286,800, filed on Nov. 4, 2002, entitled "Cipher Implementation," which is hereby incorporated by reference herein in its entirety.

BACKGROUND

Confidentiality and integrity algorithms for encryption/decryption of telecommunication transmission and reception may be defined in standards, such as but not limited to, "3GPP TS 35.201 V4.1.0 (2001-12)"—3rd Generation Partnership Project (3GPP), Technical Specification Group Services and System Aspects, 3G Security, Specification of the 3GPP Confidentiality and Integrity Algorithms, Document 1: f8 and f9 Specification". The document is publicly available from the 3GPP website http://www.3gpp.org.

Within the security architecture of the 3GPP system, there may be two standardized algorithms: a confidentiality algorithm f8, and an integrity algorithm f9. These algorithms (also referred to as functions, the terms being used interchangeably) may be based on the so-called KASUMI algorithm (also referred to as simply KASUMI), a block cipher that may produce a 64-bit output from a 64-bit input under the control of a 128-bit key.

The confidentiality algorithm f8 may be a stream cipher used to encrypt or decrypt blocks of data under a confidentiality key CK. The block of data may be between 1 and 20000 bits long, for example. The f8 algorithm may use KASUMI in a form of output-feedback mode as a keystream generator.

The integrity algorithm f9 may compute a 32-bit MAC (Message Authentication Code) of a given input message using an integrity key IK.

In the 3GPP standard, the length of the message for use with the f8 and f9 algorithms may vary from 64 bits to 5120 bits. The message may be divided into blocks of 64 bits. The largest message may thus comprise 80 blocks (80.times.64=5120). In the 3GPP standard, the implementation of the f8 and f9 algorithms for 80 blocks may comprise 81 KASUMI modules. There may be 16,000 (16K) gates for one KASUMI module. Accordingly, there may be 81.times.16K=1296K gates for the implementation of the f8 and f9 algorithms. This may be disadvantageously large in terms of chip size in various telecommunications systems, such as but not limited to, WCDMA (wideband code division multiple access) chipsets.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

Figure 1:
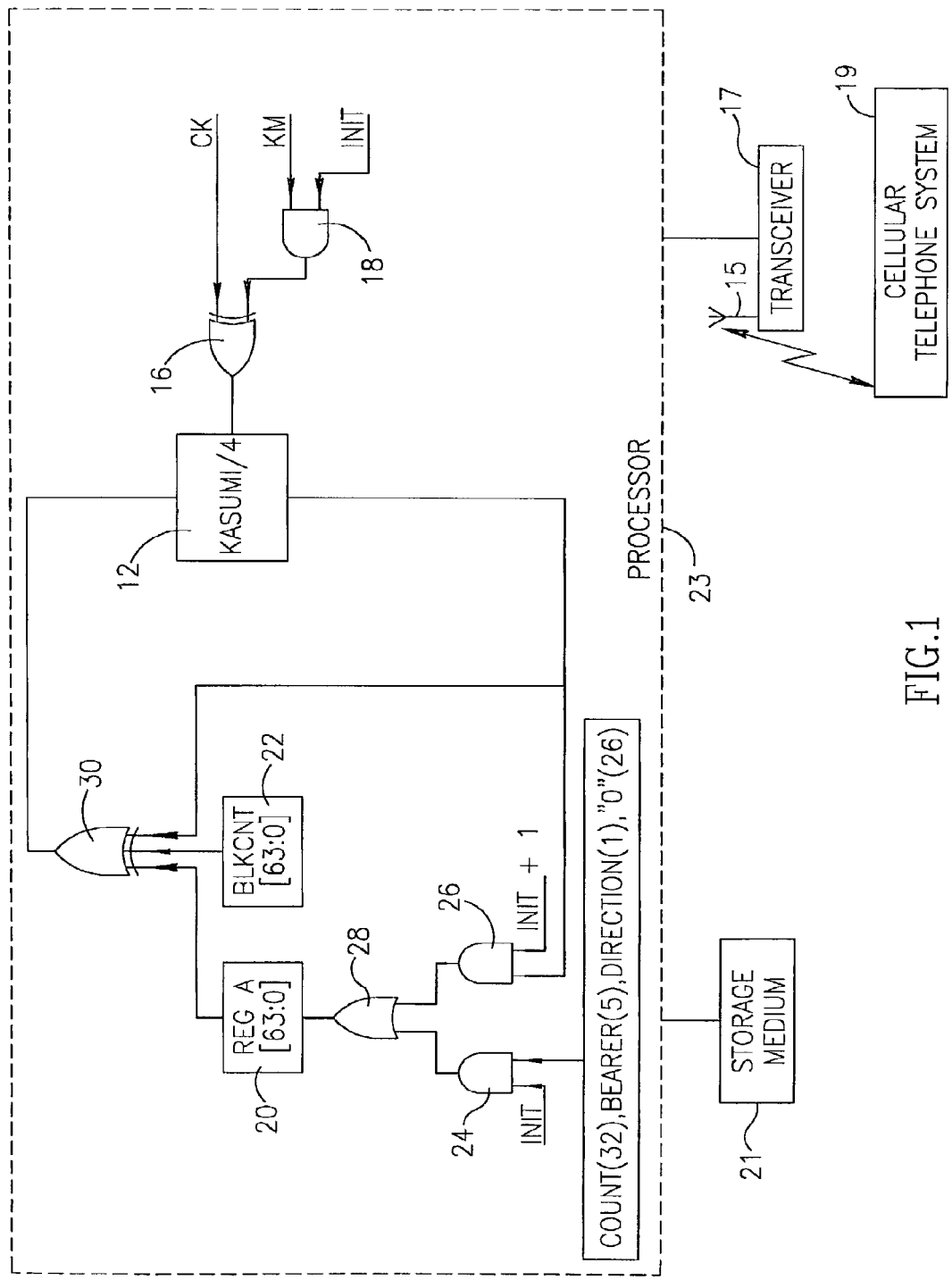
FIG. 1 is a simplified illustration of apparatus for generating a keystream for performing a confidentiality function, which may form part of a communications system, in accordance with an embodiment of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following detailed description, numerous specific details are set forth in order to provide a thorough understanding of the invention. However it will be understood by those of ordinary skill in the art that the present invention may be practiced without these specific details. In other instances, well-known methods, procedures, components and circuits have not been described in detail so as not to obscure the present invention.

Some portions of the detailed description that follows are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

Reference is now made to FIG. 1, which illustrates apparatus for generating a keystream, in accordance with an embodiment of the invention. The keystream generator of FIG. 1 may comprise a partial KASUMI block cipher 12, as opposed to a full KASUMI block cipher. As described in detail further hereinbelow, partial KASUMI block cipher 12 may be used to generate at least one of a keystream and a message authentication code, without necessarily utilizing the full KASUMI block cipher. (For example, the keystream and/or message authentication code may be generated solely with the partial KASUMI block cipher or optionally in part with the partial KASUMI block cipher and in part with a full KASUMI block cipher.) In order to better understand the partial KASUMI block cipher 12, the full KASUMI block cipher will be described with reference to FIG. 2.

The apparatus of FIG. 1 may form part of a communications system, such as but not limited to, a code division multiple access (CDMA) or WCDMA receiver or communications system, GSM (Global System for Mobile Communication), EDGE (Enhanced Data Rates For Global Evolution), UMTS (Universal Mobile Telecommunication System), UTRAN (UMTS Terrestrial Radio Access Network) and FOMA (Freedom Of Mobile Multimedia Access), which may comprise communications components, such as but not limited to, a transceiver 17 which may communicate data between the partial KASUMI block cipher 12 and a cellular telephone system 19, e.g., via an antenna 15. Antenna 15 may be suitable for supporting communication in any of the abovementioned communication systems. A storage medium 21, such as but not limited to, a floppy disk, compact disc, hard drive, or volatile or non-volatile memory array, may be provided for storing instructions that enable a processor 23 to perform a confidentiality algorithm and/or an integrity algorithm comprising an output from the partial KASUMI block cipher 12, as described more in detail hereinbelow. Processor 23 may comprise, without limitation, components enclosed in a dashed box in FIG. 1, as described further hereinbelow. However, it is to be emphasized that processor 23 is not limited to the components shown in FIG. 1, and may comprise other components other than those shown in FIG. 1.

Figure 2:
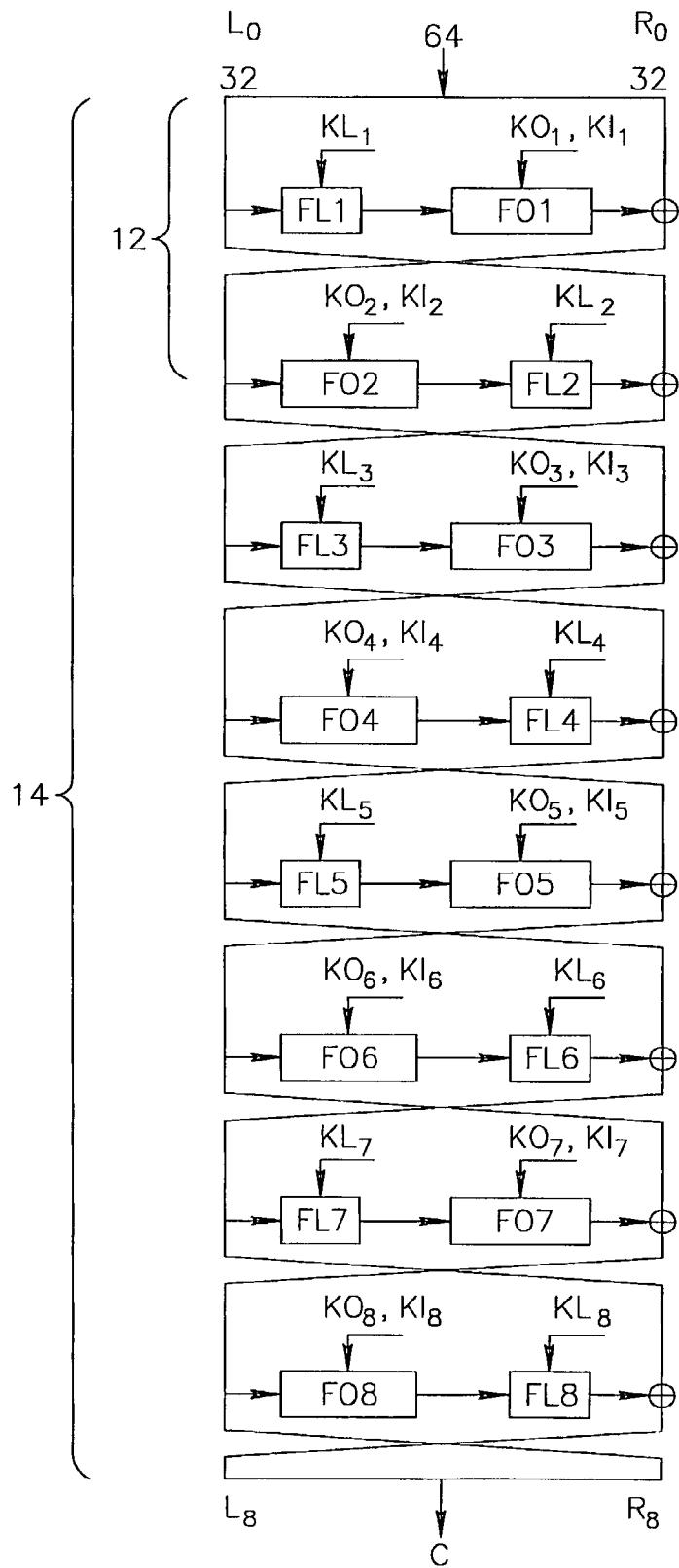
FIG. 2 is a simplified block diagram of a partial KASUMI block cipher, in accordance with an embodiment of the invention.

Reference is now made to FIG. 2, which illustrates a full KASUMI block cipher 14 and the partial KASUMI block cipher 12. The full KASUMI block cipher 14 and the partial KASUMI block cipher 12 may comprise a number of subfunctions OF, FI and FL (described hereinbelow with reference to FIGS. 3, 4 and 5, respectively), used in conjunction with associated sub-keys (KL, KO, KI) in a Feistel structure comprising a number of rounds (and rounds within rounds for some subfunctions).

The full KASUMI block cipher 14 may operate on a 64-bit input I using a 128-bit key K to produce a 64-bit output OUTPUT, as follows:

The input I may be divided into two 32-bit strings $L_0$ and $R_0$, wherein $$I = L_0.\|R_0$$

For each integer i with $1 \leq I \geq 0.8$:

$$R_i = L_{i-1}, L_i = R_{i-1}.\oplus f_i(L_{i-1}, RK_i)$$

wherein
i=the $i^{th}$ round function of KASUMI,
$f_i$=the round function with $L_{i-1}$, and round key $RK_i$ as inputs.

The result OUTPUT equals the 64-bit string $(L_8.\|R_8)$ offered at the end of the eighth round.

($\oplus$ represents the bitwise exclusive-OR (XOR) operation, and .$\|$. represents the concatenation of two operands.)

The function $f_i$ may take a 32-bit input I and return a 32-bit output 0 under the control of a round key $RK_i$, where the round key may comprise the subkey triplet of $(KL_i, KO_i, KI_i)$. The function $f_i$ may be constructed from two subfunctions; FL and FO with associated subkeys $KL_i$ (used with FL) and subkeys $KO_i$ and $KI_i$ (used with FO).

The $f_i$ function may have two different forms as follows:
For rounds 1, 3, 5 and 7:

$$f_i(I, RK_i) = FO(FL(I, KL_i), KO_i, KI_i)$$

For rounds 2, 4, 6 and 8:

$$f_i(I, K_i) = FL(FO(I, KO_i, KI_i), KL_i)$$

Accordingly, for oddrounds the round data may be passed through FL( ) and then FO( ), while for even rounds it may be passed through FO( )and then FL( ).

Figure 3:
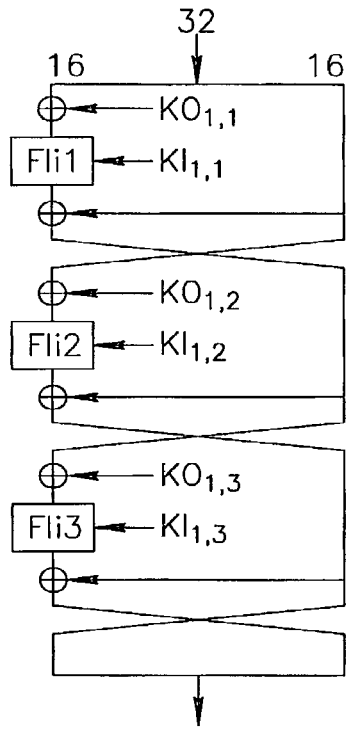
FIG. 3 is a simplified block diagram of a first subfunction.

Reference is now made to FIG. 3, which illustrates the function FO. The input to the function FO may comprise a 32-bit data input I and two sets of subkeys, a 48-bit subkey $KO_i$ and 48-bit subkey $KI_i$.

The 32-bit data input may be split into two halves, $L_0$ and $R_0$ wherein $I = L_0.\|R_0$.

The 48-bit subkeys may be subdivided into three 16-bit subkeys wherein $$KO_i = KO_{i,1}.\|KO_{i,2}.\|KO_{i,3} \text{ and}$$

$$KI_i = KI_{i,1}\|KI_{i,2}\|KI_{i,3}.$$

For each integer j with $1 \leq j \geq 3$:

$$R_j = FI(L_{j-1} \oplus KO_{ij}, KI_{ij}) \oplus R_{j-1}$$

$$L_j = R_{j-1}$$

which may return the 32-bit value $(L_3.\|R_3)$.

Figure 4:
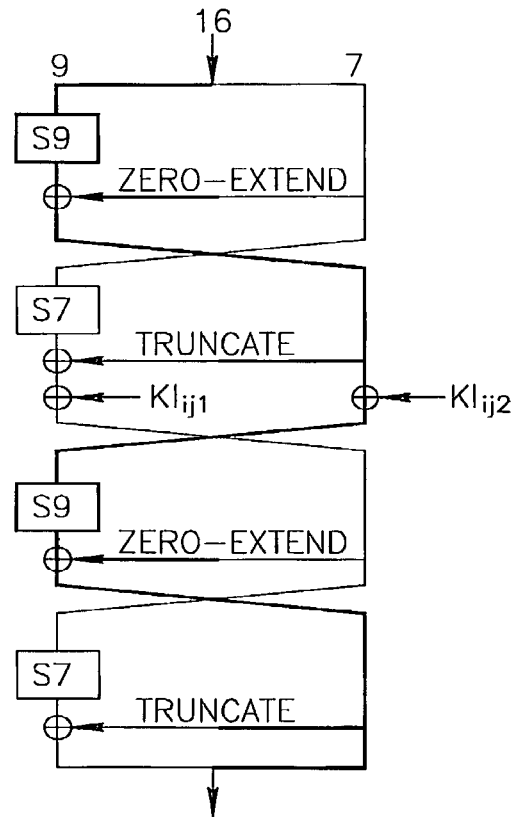
FIG. 4 is a simplified block diagram of a second subfunction.

Reference is now made to FIG. 4, which illustrates the function FI. The thick and thin lines in FIG. 4 may be used to emphasize the difference between 9-bit and 7-bit data paths, respectively.

The function FI may take a 16-bit data input I and 16-bit subkey $KI_{ij}$. The input I may be split into two unequal components, a 9-bit left half $L_0$ and a 7-bit right half $R_0$ where $I = L_0.\|R_0$.

Similarly the key $KI_{ij}$ may be split into a 7-bit component $KI_{ij,1}$, and a 9-bit component $KI_{ij,2}$ where $KI_{ij} = KI_{ij,1}.\|KI_{ij,2}$.

The function FI may use two S-boxes, S7 which maps a 7-bit input to a 7-bit output, and S9 which maps a 9-bit input to a 9-bit output. The two S-boxes are defined further hereinbelow. The function FI may also use two additional functions, designated ZE( ) and TR( ), defined as follows:

ZE(x) may take the 7-bit value x and convert it to a 9-bit value by adding two zero bits to the most-significant end.

TR(x) may take the 9-bit value x and convert it to a 7-bit value by discarding the two most-significant bits.

The following series of operations may be defined:

$$L_1 = R_0 R_1 = S9[L_0] \oplus ZE(R_0)$$

$$L_2 = R_1. \oplus KI_{ij,2} R_2 = S7[L_1]. \oplus TR(R_1). \oplus KI_{ij,1}$$

$$L_3 = R_2 R_3 = S9[L_2]. \oplus ZE(R_2)$$

$$L_4 = S7[L_3]. \oplus TR(R_3) R_4 = R_3$$

The function FI may return the 16-bit value $(L_4.\|R_4)$.

The two S-boxes mentioned above may be implemented in combinational logic as well as by a look-up table. For the two S-boxes, the input x comprises either seven or nine bits with a corresponding number of bits in the output y, wherein:

$$x = x8\|x7\|x6\|x5\|x4\|x3\|x2\|x1\|x0$$

and $$y = y8\|y7\|y6\|y5\|y4\|y3\|-y2\|y1\|y0$$

wherein the x8, y8 and x7,y7 bits may only apply to S9, and the x0 and y0 bits may be the least significant bits.

In the logic equations:

$x0x1x2$ implies $x0 \cap x1 \cap x2$ where $\cap$ is the AND operator.

Gate Logic for $S7$:

$y0 = x1x3 \oplus x4 \oplus x0x1x4 \oplus x5 \oplus x2x5 \oplus x3x4x5 \oplus$
$\quad x6 \oplus x0x6 \oplus x1x6 \oplus x3x6 \oplus x2x4x6 \oplus x1x5x6 \oplus x4x5x6$ $y1 = x0x1 \oplus x0x4 \oplus x2x4 \oplus x5 \oplus x1x2x5 \oplus x0x3x5 \oplus$
$\quad x6 \oplus x0x2x6 \oplus x3x6 \oplus x4x5x6 \oplus 1$ $y2 = x0 \oplus x0x3 \oplus x2x3 \oplus x1x2x4 \oplus x0x3x4 \oplus x1x5 \oplus$
$\quad x0x2x5 \oplus x0x6 \oplus x0x1x6 \oplus x2x6 \oplus x4x6 \oplus 1$ $y3 = x1 \oplus x0x1x2 \oplus x1x4 \oplus x3x4 \oplus x0x5 \oplus x0x1x5 \oplus$
$\quad x2x3x5 \oplus x1x4x5 \oplus 3x2x6 \oplus x1x3x6$ $y4 = x0x2 \oplus x3 \oplus x1x3 \oplus x1x4 \oplus x0x1x4 \oplus x2x3x4 \oplus x0x5 \oplus$
$\quad x1x3x5 \oplus x0x4x5 \oplus x1x6 \oplus x3x6 \oplus x0x3x6 \oplus x5x6 \oplus 1$ -continued $$y5 = x2 \oplus x0x2 \oplus x0x3 \oplus x1x2x3 \oplus x0x2x4 \oplus x0x5 \oplus 2x5 \oplus$$
$$x4x5 \oplus x1x6 \oplus x1x2x6 \oplus x0x3x6 \oplus x3x4x6 \oplus x2x5x6 \oplus 1$$

$$y6 = x1x2 \oplus x0x1x3 \oplus x0x4 \oplus x1x5 \oplus x3x5 \oplus x6 \oplus$$
$$x0x1x6 \oplus x2x3x6 \oplus x1x4x6 \oplus x0x5x6$$

Decimal Table:

| |
|---|
| 54, 50, 62, 56, 22, 34, 94, 96, 38, 6, 63, 93, 2, 18, 123, 33, 55, 113, 39, 114, 21, 67, 65, 12, 47, 73, 46, 27, 25, 111, 124, 81, 53, 9, 121, 79, 52, 60, 58, 48, 101, 127, 40, 120, 104, 70, 71, 43, 20, 122, 72, 61, 23, 109, 13, 100, 77, 1, 16, 7, 82, 10, 105, 98, 117, 116, 76, 11, 89, 106, 0, 125, 118, 99, 86, 69, 30, 57, 126, 87, 112, 51, 17, 5, 95, 14, 90, 84, 91, 8, 35, 103, 32, 97, 28, 66, 102, 31, 26, 45, 75, 4, 85, 92, 37, 74, 80, 49, 68, 29, 115, 44, 64, 107, 108, 24, 110, 83, 36, 78, 42, 19, 15, 41, 88, 119, 59, 3 |

Gate Logic for S9:

$$y0 = x0x2 \oplus x3 \oplus x2x5 \oplus x5x6 \oplus$$
$$x0x7 \oplus x1x7 \oplus x2x7 \oplus x4x8 \oplus x5x8 \oplus x7x8 \oplus 1$$

-continued $$y1 = x1 \oplus x0x1 \oplus x2x3 \oplus x0x4 \oplus x1x4 \oplus x0x5 \oplus$$
$$x3x5 \oplus x6 \oplus x1x7 \oplus x2x7 \oplus x5x8 \oplus 1$$

$$y2 = x1 \oplus 1x0x3 \oplus x3x4 \oplus x0x5 \oplus x2x6 \oplus x3x6 \oplus$$
$$x5x6 \oplus x4x7 \oplus x5x7 \oplus x6x7 \oplus x8 \oplus x0x8 \oplus 1$$

$$y3 = x0 \oplus x1x2 \oplus x0x3 \oplus x2x4 \oplus x5 \oplus x0x6 \oplus$$
$$x1x6 \oplus x4x7 \oplus x0x8 \oplus x1x8 \oplus x7x8$$

$$y4 = x0x1 \oplus x1x3 \oplus x4 \oplus x0x5 \oplus 3x6 \oplus x0x7 \oplus$$
$$x6x7 \oplus x1x8 \oplus x2x8 \oplus x3x8$$

$$y5 = x2 \oplus x1x4 \oplus x4x5 \oplus x0x6 \oplus x1x6 \oplus x3x7 \oplus$$
$$x4x7 \oplus x6x7 \oplus x5x8 \oplus x6x8 \oplus x7x8 \oplus 1$$

$$y6 = x0 \oplus x2x3 \oplus x1x5 \oplus x2x5 \oplus x4x5 \oplus x3x6 \oplus$$
$$x4x6 \oplus x5x6 \oplus x7 \oplus x1x8 \oplus x3x8 \oplus x5x8 \oplus x7x8$$

$$y7 = x0x1 \oplus x0x2 \oplus x1x2 \oplus x3 \oplus x0x3 \oplus x2x3 \oplus$$
$$x4x5 \oplus x2x6 \oplus x3x6 \oplus x2x7 \oplus x5x7 \oplus x8 \oplus 1$$

$$y8 = x0x1 \oplus x2 \oplus x1x2 \oplus x3x4 \oplus x1x5 \oplus x2x5 \oplus$$
$$x1x6 \oplus x4x6 \oplus x7 \oplus x2x8 \oplus x3x8$$

Decimal Table:

| |
|---|
| 167, 239, 161, 379, 391, 334, 9, 338, 38, 226, 48, 358, 452, 385, 90, 397, 183, 253, 147, 331, 415, 340, 51, 362, 306, 500, 262, 82, 216, 159, 356, 177, 175, 241, 489, 37, 206, 17, 0, 333, 44, 254, 378, 58, 143, 220, 81, 400, 95, 3, 315, 245, 54, 235, 218, 405, 472, 264, 172, 494, 371, 290, 399, 76, 165, 197, 395, 121, 257, 480, 423, 212, 240, 28, 462, 176, 406, 507, 288, 223, 501, 407, 249, 265, 89, 186, 221, 428, 164, 74, 440, 196, 458, 421, 350, 163, 232, 158, 134, 354, 13, 250, 491, 142, 191, 69, 193, 425, 152, 227, 366, 135, 344, 300, 276, 242, 437, 320, 113, 278, 11, 243, 87, 317, 36, 93, 496, 27, 487, 446, 482, 41, 68, 156, 457, 131, 326, 403, 339, 20, 39, 115, 442, 124, 475, 384, 508, 53, 112, 170, 479, 151, 126, 169, 73, 268, 279, 321, 168, 364, 363, 292, 46, 499, 393, 327, 324, 24, 456, 267, 157, 460, 488, 426, 309, 229, 439, 506, 208, 271, 349, 401, 434, 236, 16, 209, 359, 52, 56, 120, 199, 277, 465, 416, 252, 287, 246, 6, 83, 305, 420, 345, 153, 502, 65, 61, 244, 282, 173, 222, 418, 67, 386, 368, 261, 101, 476, 291, 195, 430, 49, 79, 166, 330, 280, 383, 373, 128, 382, 408, 155, 495, 367, 388, 274, 107, 459, 417, 62, 454, 132, 225, 203, 316, 234, 14, 301, 91, 503, 286, 424, 211, 347, 307, 140, 374, 35, 103, 125, 427, 19, 214, 453, 146, 498, 314, 444, 230, 256, 329, 198, 285, 50, 116, 78, 410, 10, 205, 510, 171, 231, 45, 139, 467, 29, 86, 505, 32, 72, 26, 342, 150, 313, 490, 431, 238, 411, 325, 149, 473, 40, 119, 174, 355, 185, 233, 389, 71, 448, 273, 372, 55, 110, 178, 322, 12, 469, 392, 369, 190, 1, 109, 375, 137, 181, 88, 75, 308, 260, 484, 98, 272, 370, 275, 412, 111, 336, 318, 4, 504, 492, 259, 304, 77, 337, 435, 21, 357, 303, 332, 483, 18, 47, 85, 25, 497, 474, 289, 100, 269, 296, 478, 270, 106, 31, 104, 433, 84, 414, 486, 394, 96, 99, 154, 511, 148, 413, 361, 409, 255, 162, 215, 302, 201, 266, 351, 343, 144, 441, 365, 108, 298, 251, 34, 182, 509, 138, 210, 335, 133, 311, 352, 328, 141, 396, 346, 123, 319, 450, 281, 429, 228, 443, 481, 92, 404, 485, 422, 248, 297, 23, 213, 130, 466, 22, 217, 283, 70, 294, 360, 419, 127, 312, 377, 7, 468, 194, 2, 117, 295, 463, 258, 224, 447, 247, 187, 80, 398, 284, 353, 105, 390, 299, 471, 470, 184, 57, 200, 348, 63, 204, 188, 33, 451, 97, 30, 310, 219, 94, 160, 129, 493, 64, 179, 263, 102, 189, 207, 114, 402, 438, 477, 387, 122, 192, 42, 381, 5, 145, 118, 180, 449, 293, 323, 136, 380, 43, 66, 60, 455, 341, 445, 202, 432, 8, 237, 15, 376, 436, 464, 59, 461 |

Figure 5:
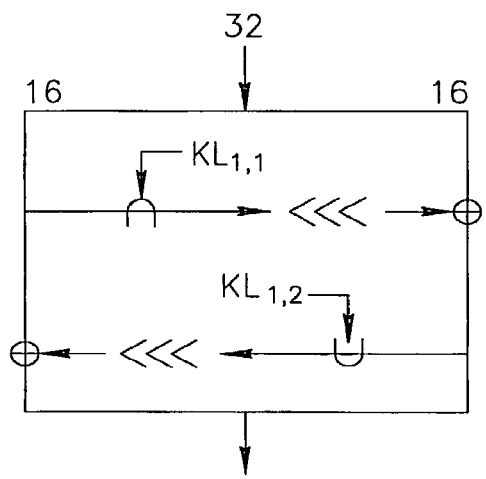
FIG. 5 is a simplified block diagram of a third subfunction.

Reference is flow made to FIG. 5, which illustrates the function FL. The input to the function FL may comprise a 32-bit data input I and a 32-bit subkey $KL_i$. The subkey may be split into two 16-bit subkeys, $KL_{i,1}$ and $KL_{i,2}$ wherein $KL_i = KL_{i,1} . \| KL_{i,2}$.

The input data I may be split into two 16-bit halves, L and R where $I = L\|R$.

$R' = R \oplus + ROL(L \cap KL_{i,1})$ $L' = L \oplus + ROL(R \cup KL_{i,2})$ wherein the 32-bit output value=(L′∥R′), and wherein ROL is the left circular rotation of the operand by one bit.

In one embodiment of the invention, the partial KASUMI block cipher 12 may comprise a one-quarter KASUMI block cipher which may comprise two rounds of the full KASUMI block cipher 14, such as the first two rounds of the full KASUMI block cipher 14.

Reference is now made again to FIG. 1. Feedback data for the partial KASUMI block cipher 12 may be modified by static data held in a buffer, such as but not limited to, a 64-bit register A (reference numeral 20), and a variable comprising an (incrementing) 64-bit counter BLKCNT (reference numeral 22). The keystream generator of FIG. 1 may be initialized with key variables before generating keystream bits. The key variables may comprise without limitation COUNT (e.g., a 32-bit time variant input), BEARER (e.g., a 5-bit input) and DIRECTION (e.g., a 1-bit input which may indicate the direction of transmission (uplink or downlink)), and a cipher key CK (e.g., a 128-bit confidentiality key) XORed with a key modifier KM (e.g., a 128-bit constant used to modify a key). For example, the partial KASUMI block cipher 12 may have an input from an XOR gate 16, which may XOR the cipher key CK with the output of an AND gate 18 which has ANDed KM with an Init bit. The COUNT, BEARER and DIRECTION inputs may be ANDed with an Init bit by an AND gate 24. An AND gate 26 may AND the output of the partial KASUMI block cipher 12 and Init+1. An OR gate 28 may OR the output of the AND gates 24 and 26, and output to register A. A gate 30 may perform a Boolean operation, such as for example an exclusive-OR (XOR) operation, on register A, BLKCNT and the output of the partial KASUMI block cipher 12.

In one non-limiting example of the invention, the 64-bit register A may be set to COUNT∥BEARER ∥DIRECTION∥0...0 (left justified with the right most 26 bits set to 0).

For example, A may equal COUNT[0] ... COUNT[31] BEARER[0] ... BEARER[4] DIRECTION[0]0 ... 0. Counter BLKCNT may be set to zero. Key modifier KM may be set to a constant 32-bit (hexadecimal) 5555 ... 5h. The initial keystream block $KSB_0$ may be set to zero.

Once the keystream generator of FIG. 1 has been initialized, (e.g., to the exemplary values in the previous paragraph), the keystream generator may be used to generate keystream blocks (KSBs). One operation of the partial KASUMI block cipher 12 may be applied to the register A, using a modified version of the confidentiality key CK:

$A = \text{Partial-KASUMI}[A]_{CK \oplus KM}$

The first result may be saved in register A, and subsequent results may be XORed with that value. To obtain the first result of the confidentiality function of FIG. 1, an XOR operation may be carried out by XOR gate 30 between register A, BLKCNT=0 and the result (of the partial KASUMI block cipher 12)=0. This result of XOR gate 30 may then be input into the partial KASUMI block cipher 12 to produce the first keystream block $KSB_1$ (in the described example, a 64-bit block) using the cipher key CK (XORed with KM and Init by XOR gate 16).

Subsequent keystream blocks may be calculated similarly, wherein BLKCNT may be increased by one for each block 1 to n (wherein n=number of blocks), and the result of the partial KASUMI block cipher 12 input into the XOR gate 30 may be taken from the previous keystream block KSB ($KSB_1 ... KSB_n$). The keystream generator may continue until BLKCNT reaches the LENGTH (the number of bits in the input bitstream), signifying the end of the user data block.

Figure 6:
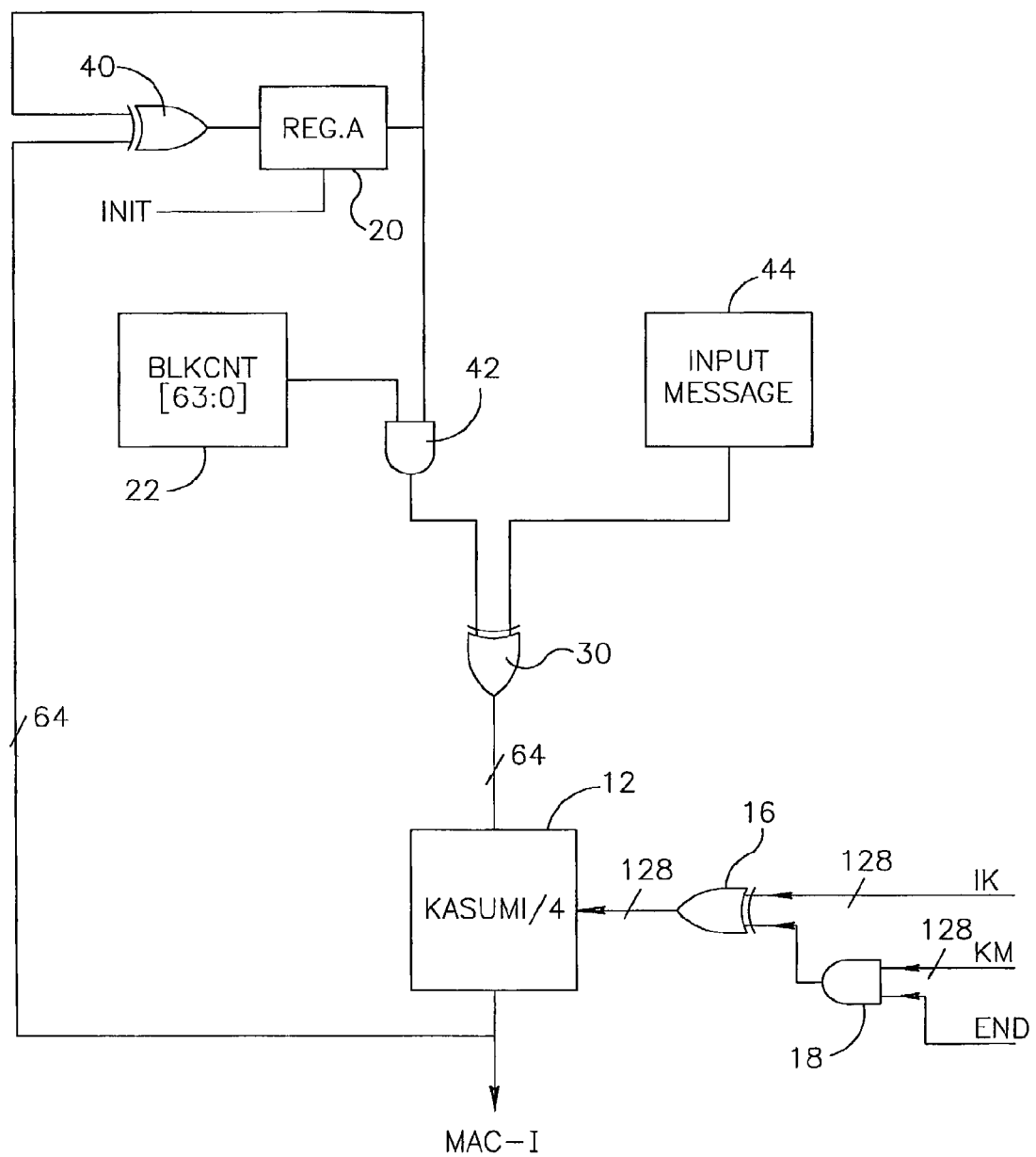
FIG. 6 is a simplified illustration of apparatus for performing an integrity function, which may form part of a communications system, in accordance with an embodiment of the invention.

Reference is now made to FIG. 6, which illustrates using the partial KASUMI block cipher 12 for performing an integrity function, in accordance with an embodiment of the invention.

The integrity function may be initialized as follows:

A=0 and B=0, wherein A and B are 64-bit registers that may be used to hold intermediate values, and a key modifier KM may be set to a constant 128-bit hexadecimal AAAAA ... Ah.

Variables may be used in the integrity function, such as FRESH, winch may be a 32-bit random input, and MESSAGE, which may be the input bitstream of LENGTH bits to be processed by the integrity function.

The integrity function may proceed as follows:

The variables COUNT, FRESH, MESSAGE and DIRECTION may be concatenated. A single '1' bit may be appended thereto, followed by between 0 and 63 '0' bits, so that the total length of the resulting string PS (padded string) may be an integral multiple of 64 bits:

$PS$=COUNT[0] ... COUNT[31] FRESH[0] ... FRESH[31] MESSAGE[0] ... MESSAGE [LENGTH−1] DIRECTION[0]1 0* wherein 0* indicates between 0 and 63 '0' bits.

The padded string PS may then be split into 64-bit blocks $PS_i$ where:

$PS = PS_0.\|PS_1\| ... PS_{BLOCKS-1}$

The following operations may be performed for each integer n with 0≤n≤BLOCKS−1:

$A = \text{Partial-KASUMI}[A \oplus PS_n]_{IK}$ $B = B \oplus A$ wherein IK may be a 128-bit integrity key.

Finally, one more application of the partial KASUMI may be carried out using a modified form of the integrity key IK.

$B = \text{Partial-KASUMI}[B]_{ik \oplus KM}$

The integrity function may produce a 32-bit message authentication code (MAC-I). MAC-I may comprise the leftmost 32 bits of the result:

MACH-I=lefthalf[B]

In other words, for each integer i with 0≤I≤31:

MAC-I[i]=B[i], wherein Bits B[32]...B[63] may be discarded.

Referring to FIG. 6, an embodiment of the invention may comprise without limitation an XOR gate 40, which may XOR tie output of the partial KASUMI block cipher 12 and the previous contents of register A, the XOR result being fed into register A with Init. The output of register A and BLKCNT may be ANDed by an AND gate 42. XOR gate 30 may XOR the output of AND gate 42 and an input message 44, the XOR result being fed into the partial KASUMI block cipher 12. KM and an end bit (flag) may be input to AND gate

18. The output of AND gate 18 may XORed with IK by XOR gate 16, whose output may be fed to the partial KASUMI block cipher 12.

When the Init bit is turned on, register A may be initially set to "0", Km may be set to a constant 128-bit hexadecimal AAAAA . . . Ah, and the input message may be the above-mentioned PS (padded string). The message may be fed block by block (e.g., 64 bits) to the partial KASUMI block cipher 12. XOR gate 30 may iteratively XOR the 64-bit block from gate 42 with the input message to register A (the previous result of the partial KASUMI block cipher 12). When BLKCNT reaches the LENGTH (the number of bits in the input bitstream), signifying the end of the data, the end flag may go up and another partial KASUMI operation may be performed on register A using IK⊕KM. The 32 most significant bits from the last partial KASUMI operation may be the MAC-I message.

Figure 7:
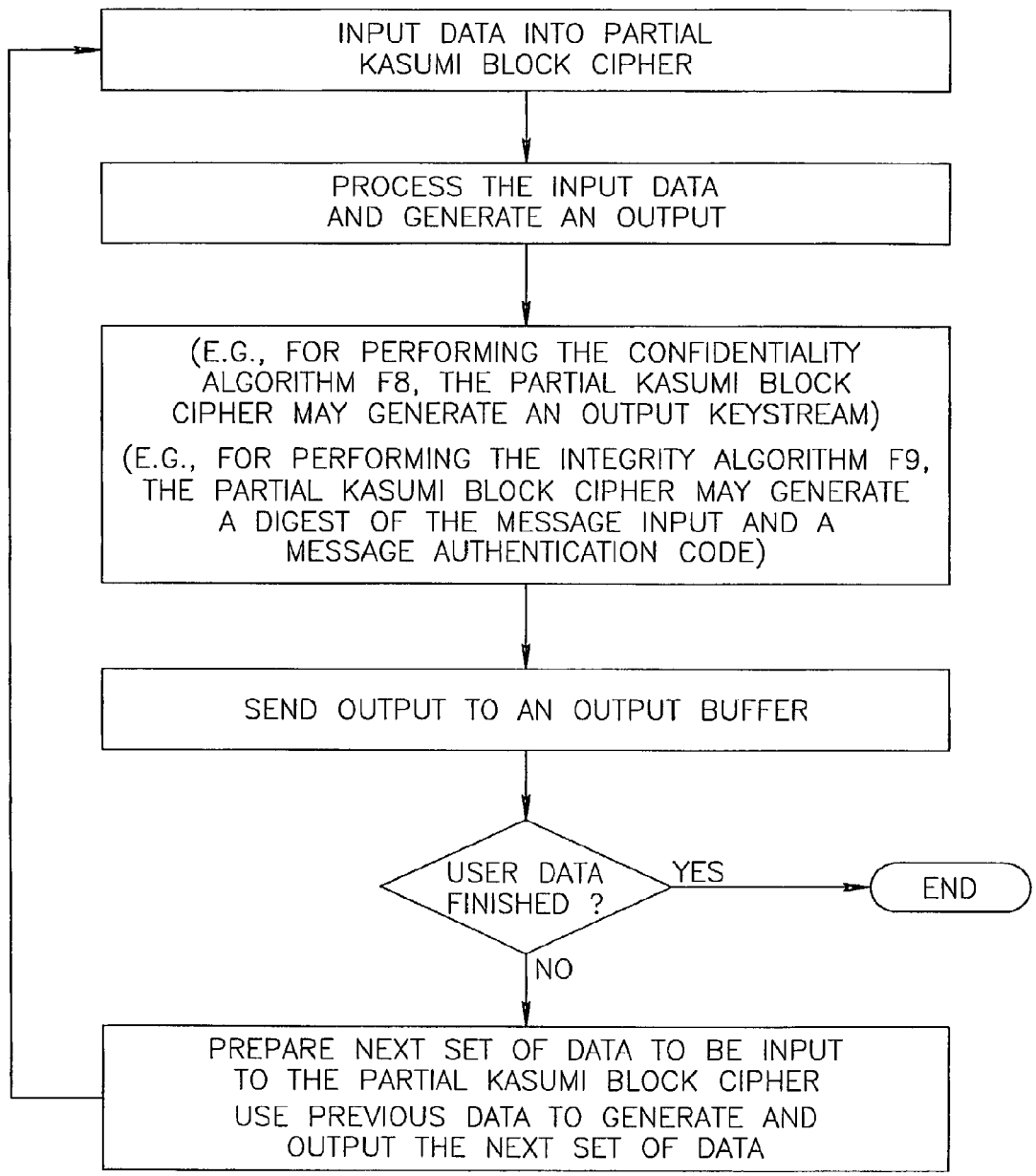
FIG. 7 is a simplified general flow chart for performing a confidentiality algorithm and an integrity algorithm with a partial KASUMI block cipher, in accordance with an embodiment of the invention.

Reference is now made to FIG. 7, which illustrates a general flow chart for performing the confidentiality algorithm f8 and the integrity algorithm f9 with the partial KASUMI block cipher 12, in accordance with an embodiment of the invention. As may be seen in FIG. 7, data (e.g., 64-bit input) may be input into the partial KASUMI block cipher 12. The partial KASUMI block cipher 12 may process (e.g., encrypt) the input data and generate an output (e.g., 64-bit output). For example, for performing the confidentiality algorithm f8, the partial KASUMI block cipher 12 may generate an output keystream, as described hereinabove, e.g., an output bitstream in multiples of 64-bits. For performing the integrity algorithm f9, the partial KASUMI block cipher 12 may generate a 64-bit digest of the message input, as described hereinabove, wherein the leftmost 32-bits of the digest are taken as the output value MAC-I (message authentication code). The output may be sent to an output buffer (e.g., register A).

The partial KASUMI block cipher 12 may process large amounts of user data in a continuous mode. In the continuous mode, the partial KASUMI block cipher 12 may not erase the previous user data, but rather use the previous data to generate and output the next set of data in a continuous loop until the user data may be finished. The continuous mode implemented with the partial KASUMI block cipher 12 may be used to perform the confidentiality algorithm f8 and the integrity algorithm f9 with a significantly fewer amount of gates than a full KASUMI block cipher. Optionally, the partial KASUMI block cipher may be used to generate some of the keystream and/or message authentication code as described hereinabove, and the full KASUMI block cipher may be used to generate the rest of the keystream and/or message authentication code.

The embodiment of FIG. 7 may comprise a program of instructions. The program storage device 21 of FIG. 1 may tangibly embody this program of instructions, readable and executable by a machine, such as processor 23.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed:

1. A method, implemented in a mobile communication device, for generating data for use in at least one of encryption, decryption, or authentication of a transmission, the method comprising:
  (a) performing, with a computing device, a logical operation on an input and a variable to generate a logical output without using any rounds of a full block cipher, wherein the logical output is provided to a partial block cipher, and wherein the logical operation is distinct from the partial block cipher;
  (b) generating, with the computing device, a cipher output of the partial block cipher by processing the logical output using only a subset of rounds of the full block cipher, wherein the full block cipher includes (i) the subset of rounds and (ii) additional rounds;
  repeating operation (a) and operation (b) to generate a plurality of cipher outputs, wherein the respective cipher output generated previously in operation (b) is utilized as the respective input the next time operation (a) is performed;
  incrementing the variable prior to each time operation (a) is repeated; and
  using the plurality of cipher outputs for at least one of encryption, decryption, or authentication of the transmission.

2. A method according to claim 1, wherein the full block cipher is all eight rounds of a KASUMI block cipher;
  wherein generating the cipher output of the partial block cipher comprises using only a subset of rounds of the KASUMI block cipher.

3. A method according to claim 1, wherein using the plurality of cipher outputs for encryption, decryption, or authentication of the transmission comprises using the plurality of cipher outputs as keystream blocks.

4. A method according to claim 3, wherein
  performing the logical operation on the input and the variable comprises performing an exclusive OR (XOR) operation on the input and the variable.

5. A method according to claim 4, wherein performing the XOR operation on the input and the variable comprises performing the XOR operation on the input, the variable, and a stored value.

6. A method according to claim 1, wherein using the plurality of cipher outputs for encryption, decryption, or authentication of the transmission comprises using the plurality of cipher outputs to generate a message authentication code corresponding to a message.

7. A method according to claim 1, wherein
  performing the logical operation on the input and the variable comprises performing the logical operation on the input, the variable, and a respective portion of a message;
  wherein the method further comprises:
    using a different portion of the message each time operation (a) is repeated.

8. A method according to claim 7, wherein performing the logical operation on the input, the variable, and the respective portion of the message comprises:
  performing an XOR operation on the input and a stored value to generate an XOR result, and
  storing the XOR result.

9. A method according to claim 7, wherein performing the logical operation on the input, the variable, and the respective portion of the message comprises:
  performing an AND operation on a value stored in a memory and the variable to generate an AND result; and
  logically combining the AND result with the respective portion of the message to generate the logical output.

10. A method according to claim 7, wherein performing the logical operation on the input, the variable, and the respective portion of the message comprises:
  logically combining a value stored in a memory and the variable to generate an intermediate result; and performing an XOR operation on the intermediate result and the respective portion of the message to generate the logical output.

11. An apparatus for use in a mobile communication device for encrypting, decrypting, or authenticating a transmission, the apparatus comprising:
a computing device configured to:
(a) perform a logical operation on an input and a variable to generate a logical output without using any rounds of a full block cipher, wherein the logical output is provided to a partial block cipher, and wherein the logical operation is distinct from the partial block cipher;
(b) generate a cipher output of the partial block cipher by processing the logical output using only a subset of rounds of the full block cipher, wherein the full block cipher includes (i) the subset of rounds and (ii) additional rounds;
repeat operation (a) and operation (b) to generate a plurality of cipher outputs, wherein the respective cipher output generated previously in operation (b) is utilized as the respective first input the next time operation (a) is performed;
increment the variable prior to each time operation (a) is repeated; and
use the plurality of cipher outputs for at least one of encryption, decryption, or authentication of the transmission.

12. An apparatus according to claim 11, wherein the full block cipher is all eight rounds of a KASUMI block cipher;
wherein the computing device is configured to implement only a subset of rounds of the KASUMI block cipher.

13. An apparatus according to claim 11, wherein the computing device is configured to use the plurality of cipher outputs as keystream blocks; and
wherein the computing device is configured to:
perform an exclusive OR (XOR) operation on the input and the variable.

14. An apparatus according to claim 13, further comprising a memory device;
wherein the computing device is configured to perform the XOR operation on the input, the variable, and a value stored in the memory device.

15. An apparatus according to claim 11,
wherein the computing device is configured to:
perform the logical operation on the input, the variable, and a respective portion of a message,
use a different portion of the message each time operation (a) is repeated, and
use the plurality of cipher outputs to generate a message authentication code corresponding to the message.

16. An apparatus according to claim 15, further comprising a memory device;
wherein the computing device is configured to:
perform an XOR operation on the input and a value stored in the memory device to generate an XOR result, and
store the XOR result in the memory device.

17. An apparatus according to claim 15, further comprising a memory device;
wherein the computing device is configured to:
perform an AND operation on a value stored in the memory device and the variable to generate an AND result; and
logically combine the AND result with the respective portion of the message to generate the logical output.

18. An apparatus according to claim 15, further comprising a memory device;
wherein the computing device is configured to:
logically combine a value stored in the memory device and the variable to generate an intermediate result; and
perform an XOR operation on the intermediate result and the respective portion of the message to generate the logical output.

19. An apparatus according to claim 11, wherein the computing device comprises a circuit configured to:
(a) perform the logical operation on the input and the variable to generate the logical output;
(b) generate the cipher output of the partial block cipher by processing the logical output using only less than all rounds of the full block cipher; and
increment the variable prior to each time operation (a) is repeated.

20. An apparatus according to claim 11, wherein the computing device comprises a processor that executes machine readable instructions;
wherein the apparatus further comprises a memory to store instructions that, when executed by the processor, cause the processor to:
(a) perform the logical operation on the input and the variable to generate the logical output;
(b) generate the cipher output of the partial block cipher by processing the logical output using only the subset of rounds of the full block cipher; and
increment the variable prior to each time operation (a) is repeated.

21. A method according to claim 1, wherein the additional rounds of the full block cipher include a repetition of the subset of rounds.

22. A method according to claim 2, wherein generating the cipher output of the partial block cipher comprises using only (i) a first round of the KASUMI block cipher and (ii) a second round of the KASUMI block cipher.

23. An apparatus according to claim 11, wherein the additional rounds of the full block cipher include a repetition of the subset of rounds.

24. An apparatus according to claim 12, wherein the computing device is configured to generate the cipher output of the partial block cipher using only (i) a first round of the KASUMI block cipher and (ii) a second round of the KASUMI block cipher.

* * * * *